United States Patent
Ress, Jr. et al.

(10) Patent No.: US 6,232,688 B1
(45) Date of Patent: May 15, 2001

(54) HIGH SPEED MAGNETIC THRUST DISK

(75) Inventors: Robert Anthony Ress, Jr., Carmel; Mark Stephen Henry, Indianapolis, both of IN (US)

(73) Assignees: Allison Advanced Development Company; Rolls-Royce Corporation, both of Indianapolis, IN (US)

( * ) Notice: Subject to any disclaimer, the term of this patent is extended or adjusted under 35 U.S.C. 154(b) by 0 days.

(21) Appl. No.: 09/301,302

(22) Filed: Apr. 28, 1999

(51) Int. Cl.[7] ...................................... H02K 7/09
(52) U.S. Cl. ......................... 310/90.5; 310/74; 415/104; 415/107
(58) Field of Search ................. 310/90.5, 74; 415/104, 415/107, 1; 416/230

(56) References Cited

U.S. PATENT DOCUMENTS

| | | | |
|---|---|---|---|
| 2,623,727 | 12/1952 | McLeod | 253/39.15 |
| 3,632,460 | 1/1972 | Palfreyman et al. | 156/175 |
| 3,966,523 | 6/1976 | Jakobsen et al. | 156/169 |
| 4,141,802 | 2/1979 | Kendall et al. | 428/366 |
| 4,216,682 | 8/1980 | Ban et al. | 74/579 |
| 4,270,256 | 6/1981 | Ewing | 29/156.8 R |
| 4,464,097 | 8/1984 | Schultz | 416/230 |
| 4,492,737 | 1/1985 | Conolly | 428/552 |
| 4,587,700 | 5/1986 | Curbishley et al. | 29/156.8 R |
| 4,639,194 | 1/1987 | Bell, III et al. | 416/241 B |
| 4,709,457 | 12/1987 | Broquere et al. | 29/456 |
| 4,867,644 | 9/1989 | Wright et al. | 416/230 |
| 4,907,736 | 3/1990 | Doble | 228/190 |
| 4,919,594 | 4/1990 | Wright et al. | 416/230 |
| 5,001,018 | 3/1991 | Takada et al. | 428/611 |
| 5,153,057 | 10/1992 | Corbett et al. | 428/283 |
| 5,222,296 | 6/1993 | Doorbar et al. | 29/889.21 |
| 5,249,877 | 10/1993 | Corsmeier | 403/24 |
| 5,305,520 | 4/1994 | Doorbar et al. | 29/889.21 |
| 5,312,695 | 5/1994 | Siemers et al. | 428/614 |
| 5,344,686 | 9/1994 | Heubert | 416/230 |
| 5,378,110 | 1/1995 | Ress, Jr. | 416/230 |
| 5,405,571 | 4/1995 | Truckner et al. | 419/8 |
| 5,410,133 | 4/1995 | Matsen et al. | 219/645 |
| 5,429,877 | 7/1995 | Eylon | 428/586 |
| 5,431,984 | 7/1995 | Keck et al. | 428/175 |
| 5,468,548 | 11/1995 | Giamei et al. | 428/294 |
| 5,481,145 | * 1/1996 | Canders et al. | 310/90.5 |
| 5,501,747 | * 3/1996 | Masteller et al. | 148/311 |
| 5,544,805 | 8/1996 | Allasoeur et al. | 228/190 |
| 5,558,728 | 9/1996 | Kobayashi et al. | 148/421 |
| 5,599,615 | 2/1997 | Swift et al. | 128/293.1 |
| 5,658,125 | * 8/1997 | Burns et al. | 415/1 |
| 5,717,263 | * 2/1998 | Cox | 310/261 |
| 5,749,700 | * 5/1998 | Henry et al. | 310/90.5 |
| 5,760,508 | * 6/1998 | Jennings et al. | 310/90 |
| 5,840,390 | 11/1998 | Fujiwara | 428/37 |
| 5,946,801 | 9/1999 | Twigg et al. | 29/889.71 |

\* cited by examiner

*Primary Examiner*—Karl Tamai
(74) *Attorney, Agent, or Firm*—Woodard, Emhardt, Naughton, Moriarty & McNett

(57) ABSTRACT

The present invention contemplates an internally reinforced high-speed magnetic thrust disk. In one embodiment the internally reinforced composite thrust disk comprises a plurality of high strength fibers coupled together by a soft magnetic alloy. Further, in one aspect the disk having internally reinforced zones for controlling bore growth and counteracting forces associated with the reaction between the stator and the rotor of the electromagnetic thrust bearing system.

22 Claims, 12 Drawing Sheets

HIGH SPEED MAGNETIC THRUST DISK

BACKGROUND OF THE INVENTION

The present invention relates generally to the design and fabrication of a composite structure comprising soft magnetic alloys and high strength fibers. More particularly, the present invention has one form defined by an internally reinforced metal matrix composite thrust disk for use in an electromagnetic thrust bearing. The selectively reinforced regions of the thrust disk contain a high strength iron cobalt metal matrix composite material. Although the present invention was developed for use in gas turbine engines, certain applications may be outside this field.

It is well known that a gas turbine engine integrates a compressor and a turbine having components that rotate at extremely high speeds in a high temperature environment. One component is a rotor disk that carries a plurality of airfoils utilized to influence the gaseous flow within the engine. The rotating components typically cooperate with a rotatable shaft and are supported by radial bearings and a thrust bearing that must withstand significant dynamic and static loads within a hostile environment. During operation of the gas turbine engine, the bearings are subjected to forces including: shock loads, such as from landings; maneuver loads, such as associated with sudden change in direction; and, centrifugal loads attendant with the mass of the rotating components.

The desire to increase efficiency and power output from gas turbine engines has caused many engine designers to consider the application of magnetic bearings for supporting the rotor and rotatable shaft. The integration of magnetic bearings into an engine will enable the rotor and rotatable shaft to be supported by magnetic forces, eliminate frictional forces, eliminate mechanical wear and allow the removal of the lubrication system.

Magnetic thrust bearings include a magnetic flux field and a rotatable thrust disk that is acted upon by the magnetic flux field. The application of magnetic thrust bearings in flight weight gas turbine engines require compactactness of bearing design, which ultimately equates to lighter weight. Prior designers of gas turbine engines have utilized materials for the rotating thrust disk that experience a loss of mechanical properties at elevated temperatures. This loss of mechanical properties limits the maximum rotational speed that the thrust disk can be operated at, thereby effectively limiting the maximum rotational speed of the engine.

Although the prior techniques utilizing magnetic thrust bearings for gas turbine engines are steps in the right direction, the need for additional improvement still remains. The present invention satisfies this need in a novel and unobvious way.

SUMMARY OF THE INVENTION

One aspect of the present invention contemplates a high-speed internally reinforced magnetically responsive thrust member.

In one form of the present invention there is contemplated an apparatus, comprising: a housing; a member rotatable relative to the housing; a magnetically responsive structure coupled to and rotatable with the member, the structure formed of a soft magnetic alloy material with at least a portion of the structure internally reinforced with at least one elongated high strength reinforcing member.

Another form of the present invention contemplates an electromagnetic thrust bearing, comprising: a stator having a stator surface; a rotor having a rotor surface spaced from the stator surface, the rotor having a first internally reinforced portion for inducing a first roll to the rotor to cancel at least a portion of an opposite second roll induced in the rotor by an attractive force between the rotor and the stator.

In yet another form of the present invention there is contemplated an apparatus, comprising: a magnetically responsive member having an iron based soft magnetic alloy portion, the member having a bore formed therein that is internally reinforced with a first high strength magnetic matrix composite zone for controlling bore growth, and wherein the member is internally reinforced with a second high strength magnetic matrix composite zone substantially normal to the first high strength magnetic matrix composite zone, and further wherein the high strength magnetic matrix composite zones include the magnetic alloy and at least one high strength fiber.

One object of the present invention is to provide a unique high speed magnetic thrust disk.

Related objects and advantages of the present invention will be apparent from the following description.

DESCRIPTION OF THE PREFERRED EMBODIMENT

Figure 1:
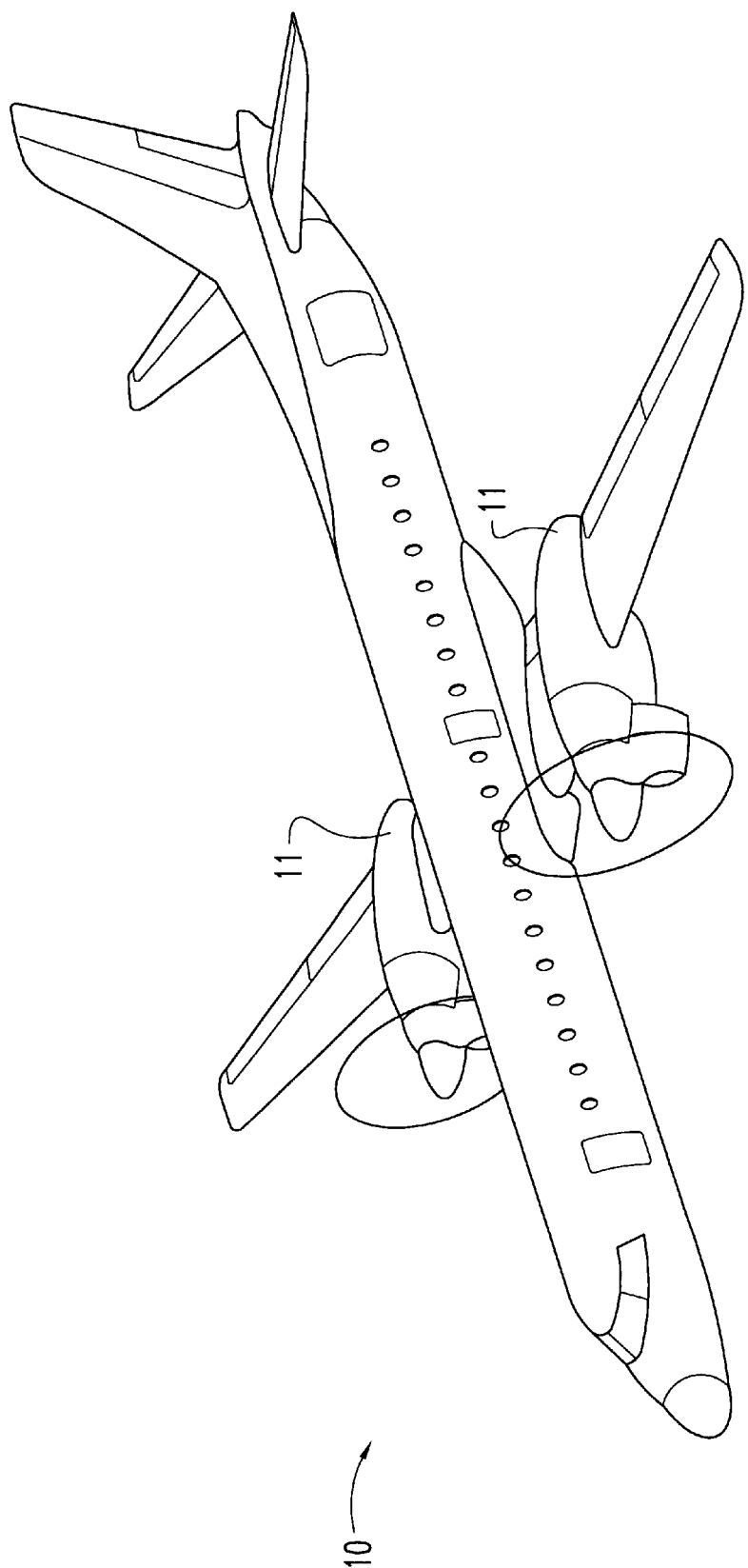
FIG. 1 is a perspective view of an aircraft having a gas turbine engine coupled thereto.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
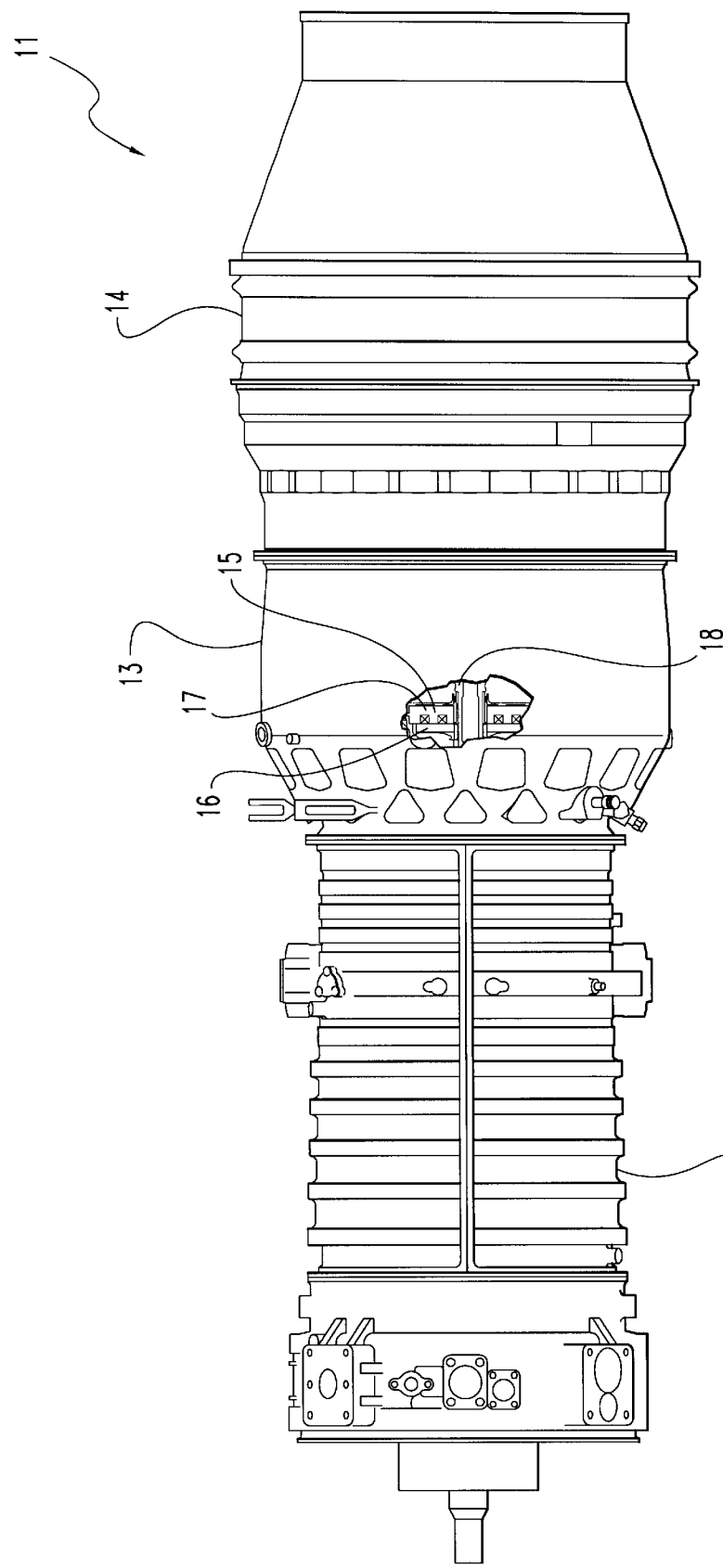
FIG. 2 is an enlarged partially fragmented side elevational view of the gas turbine engine of FIG. 1.

With reference to FIGS. 1 and 2, there is illustrated an aircraft 10 having an aircraft flight propulsion engine 11. It is understood that an aircraft is generic and includes helicopters, tactical fighters, trainers, missiles and other related apparatuses. In one embodiment, the flight propulsion engine 11 defines a gas turbine engine integrating a compressor 12, a combustor 13 and a power turbine 14. Gas turbine engines are just one form of high-speed turbo machinery. In one form the turbine has a tip speed greater than 2,000 feet per second, and the compressor has a rim speed greater than 1,400 feet per second. However, a person of ordinary skill in the art will appreciate that other tip and rim speeds are contemplated herein. The term "tip speed" is used herein to denote the speed at the tip of the rotating airfoil, and the term "rim speed" is used herein to denote the speed at the rim of the rotor disk.

It is important to realize that there are a multitude of ways in which the components can be linked together. Additional compressors and turbines can be added with intercoolers connecting between the compressors and reheat combustion chambers can be added between the turbines. Further, gas turbine engines are equally suited to be used for industrial applications. Historically, there has been a widespread application of industrial gas turbine engines such as pumping sets for gas and oil transmission lines, electricity generation, and naval propulsion.

With reference to FIG. 2, there is illustrated an electromagnetic thrust bearing 15 having a thrust disk rotor 16 and a stator 17 for positioning a rotating element relative to a static structure. In one embodiment the elements are deployed within high-speed turbomachines, and in a more preferred embodiment, the thrust disk rotor 16 has a rim speed greater than 800 feet per second. However, the present invention is applicable to thrust disk rotors operating at other speeds. Additionally, the thrust bearing 15 transmits to the static structure any axial load applied to or generated by the rotating elements. The thrust disk rotor 16 is mounted on a shaft 18, which is rotatable within a mechanical housing of the gas turbine engine. It is understood that the bearing system set forth herein is equally applicable to a turbine and/or a compressor within the gas turbine engine.

The use of magnetic bearings instead of conventional oil lubrication bearings may facilitate the removal of the engine lubrication system, resulting in system weight reduction, reduced parasitic losses, simplification of the engine design and improved engine reliability through the elimination of bearing wear. Further, the use of magnetic bearings instead of conventional oil lubrication bearings may benefit the environment by eliminating the handling, storing and disposing of synthetic oils. While one aspect of the present invention relates to an electromagnetic thrust bearing 15, it is important to realize that many aspects of the present invention can be utilized with magnetic radial bearings, motors, generators, relays, and magnetic actuators. A pair of commonly owned U.S. patents, U.S. Pat. No. 5,658,125 entitled "Magnetic Bearings as Actuation for Active Compressor Stability Control", and U.S. Pat. No. 5,749,700 entitled "High Speed High Temperature Hybrid Magnetic Thrust Bearing" are incorporated herein by reference.

Figure 3:
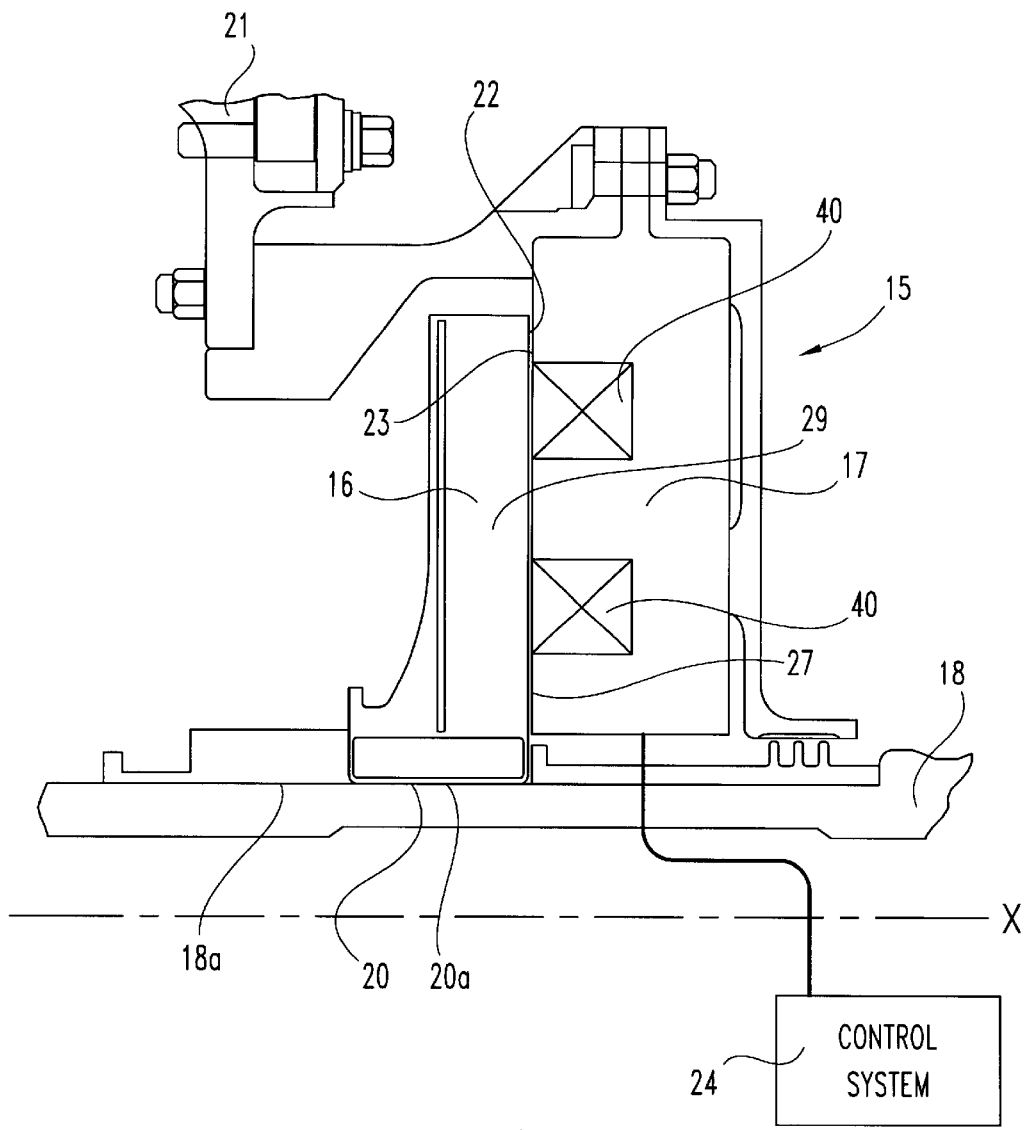
FIG. 3 is an enlarged partial sectional view of one embodiment of the thrust bearing comprising a portion of the FIG. 2 gas turbine engine.

With reference to FIG. 3, there is illustrated an enlarged view of the active electromagnetic thrust bearing 15 wherein the magnetic thrust disk rotor 16 is axially spaced from the stator 17. The components of the electromagnetic thrust bearing 15 are positioned relative to shaft 18 so as to counteract axial thrust loading. The magnetic thrust disk 16 in one preferred embodiment is a reinforced high-speed high temperature disk with a bore 20 formed therethrough. The magnetic thrust disk 16 is fixedly coupled to the rotatable shaft 18, and in a preferred embodiment, the bore 20 has a bore surface 20a that is mated in an interference fit with the outer surface 18a of shaft 18. Stator 17 is coupled to a portion of the gas turbine engine's static structure, which includes a mechanical housing 21. In a preferred embodiment, the thrust disk rotor surface 22 and the stator surface 23 are substantially parallel and axially spaced from one another when the electromagnetic thrust bearing has been actuated to produce forces to counteract the axial trust loading.

The stator 17 has a structure comprising a magnetic alloy and one or more coils 40 that when energized produce an attractive force between the rotor 16 and the stator 17. More particularly, when the electromagnetic thrust bearing 15 is actuated, a power supply (not illustrated) induces a current in the one or more coils 40, which emit a magnetic flux field, that intercepts the thrust disk 16. In one embodiment, a control system 24 is utilized to adjust the current flow to the coils 40 so that the attractive force between the rotor 16 and the stator 17 cancel the axial thrust load acting on the shaft.

Figure 4:
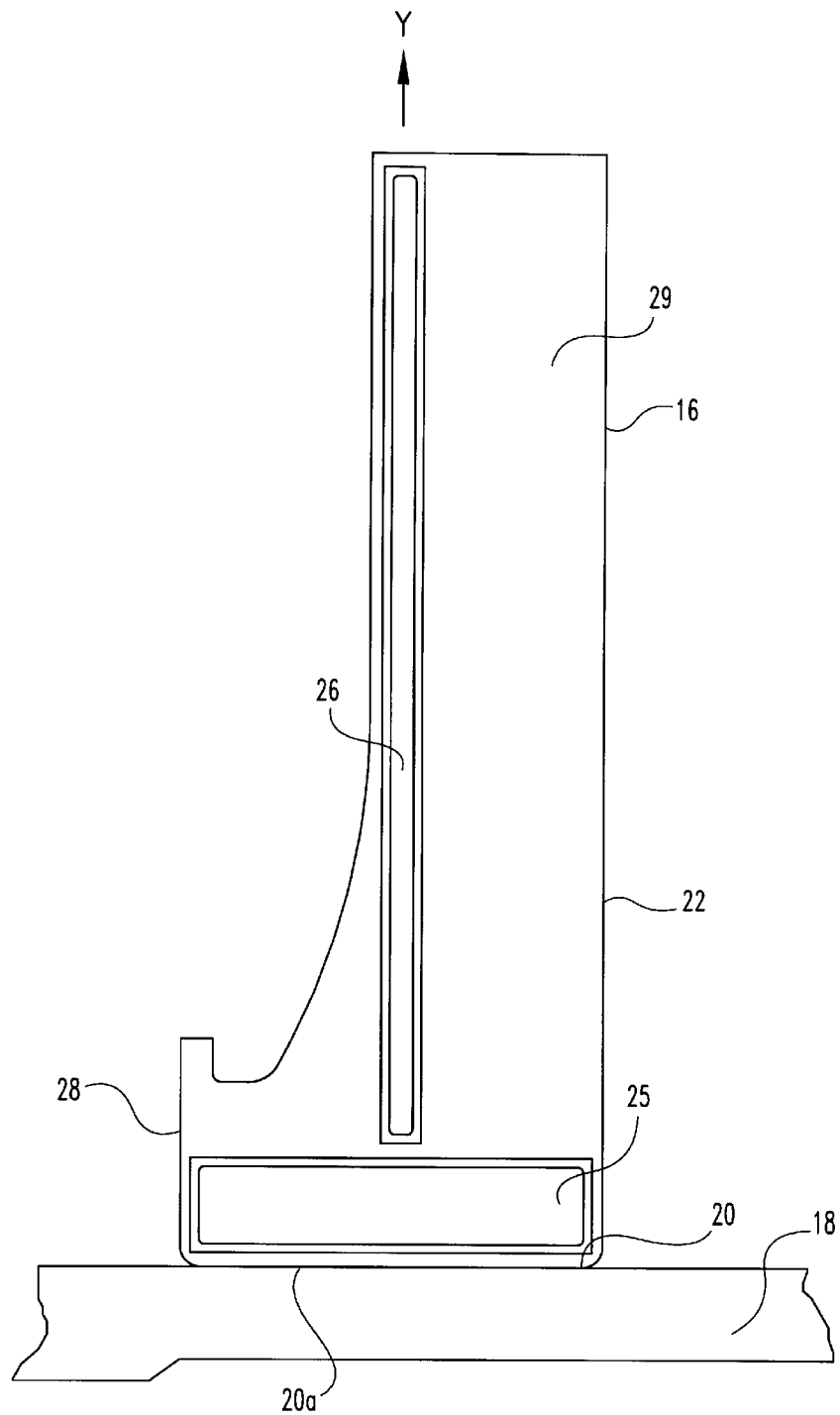
FIG. 4 is an enlarged sectional view of the selectively reinforced magnetic thrust disk comprising a portion of the FIG. 3 magnetic thrust bearing.

Referring to FIG. 4, there is illustrated an enlarged partial sectional view of the electromagnetic thrust disk 16 coupled to the rotatable shaft 18. The electromagnetic thrust disk 16 is a substantially annular member that is press fit over the outside diameter of the shaft 18. In the preferred embodiment, the electromagnetic thrust disk 16 is symmetrical about an axial centerline X. The electromagnetic thrust disk 16 preferably comprises an internally reinforced magnetically responsive metallic material portion, and more preferably comprises an iron-cobalt magnetic (Fe-Co) alloy. In one embodiment, cobalt is the primary alloying element and the amount of cobalt by weight is less than about 55%, and in a more preferred form, the amount of cobalt by weight is in the range from about 20% to about 55%. These iron-cobalt alloys are high saturation, high Curie temperature, low core loss soft magnetic alloys that generally in an unreinforced state are not suited for the relatively high tensile capability needed for the rotational elements within gas turbine engines. However, iron-cobalt magnetically responsible alloys having other amounts of cobalt by weight are contemplated herein.

A preferred embodiment of the thrust disk 16 comprises an internally reinforced fabricated flat disk containing zones 25 and 26 that are reinforced with a high strength iron-cobalt metal matrix composite material. The reinforced zone 25 is disposed around the base/bore 20 and is designed and constructed to limit radial growth at the bore 20 and add a high strength material system to this highly stressed region. Preferably, the reinforced zone 25 is radially short and extends along the bore 20. The minimization and/or elimination of radial growth of the bore 20 facilitates maintaining an interference fit between the thrust disk 16 and the shaft 18. The reinforced radial zone 26 is spaced axially from the rotor surface 22 of the thrust disk 16. Preferably, the reinforced radial zone 26 is radially long and axially thin. The location, size, and number of reinforced zones are not intended herein to be limited to what is disclosed in the specific embodiments set forth in the figures. The reinforcing zones have been shown as rectangular in cross-section, however, other cross-sections are contemplated herein including, but not limited to square, triangular, trapezoidal, and other irregular cross-sections. Design parameters for a particular application may dictate different zone configurations.

Figure 5:
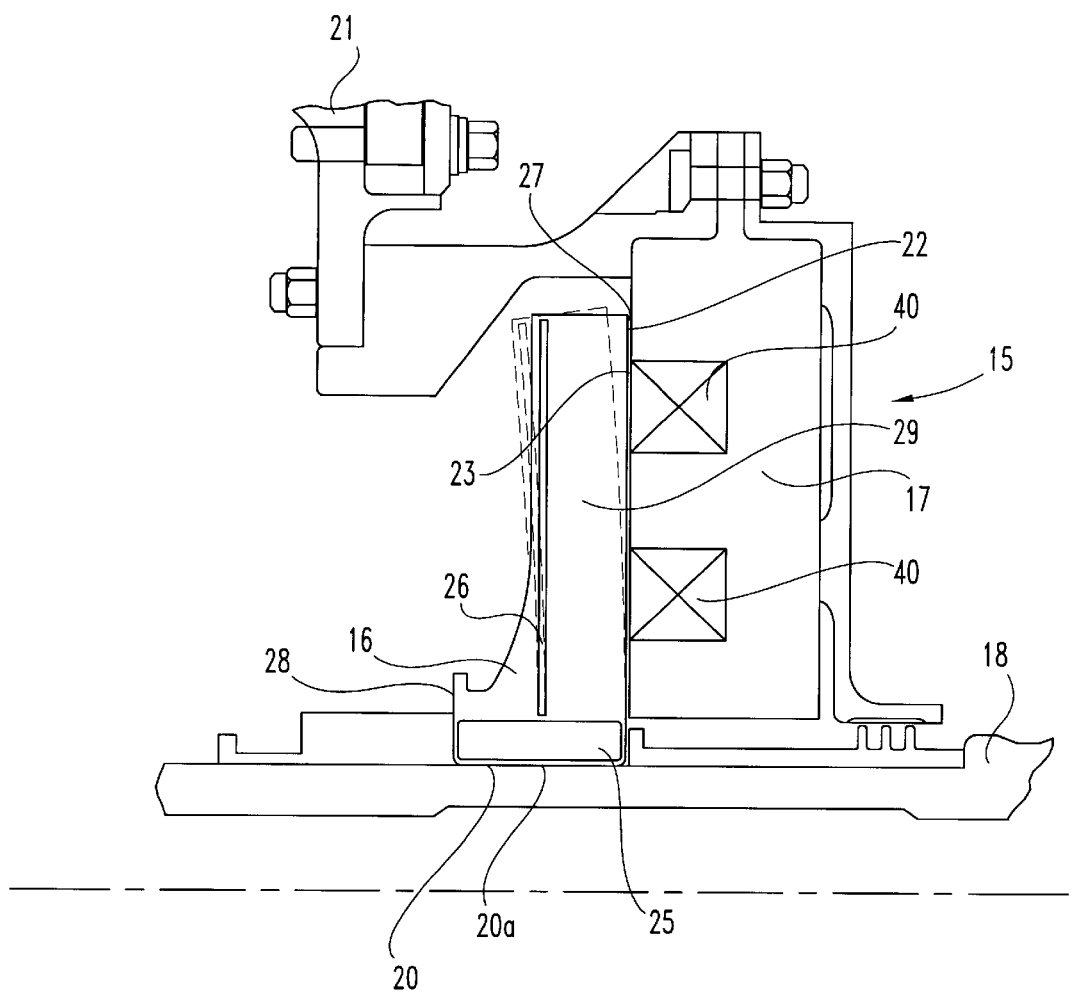
FIG. 5 is an enlarged partial sectional view of the thrust bearing of FIG. 3, wherein a counteracting roll is shown in phantom lines.

Referring to FIG. 5, there is illustrated one embodiment of thrust disk 16 wherein the reinforced radial zone 26 is designed to induce a counterclockwise roll to the thrust disk 16 (the amount of roll is amplified in the drawing), which is indicated by dashed lines. The counterclockwise roll induced by the reinforced radial zone 26 cancels at least a portion of the clockwise roll induced by the attractive force between the rotor 16 and the stator 17. Balancing of the clockwise and counterclockwise rolls positions the thrust disk rotor surface 22 and opposing stator surface 23 substantially parallel. Further, the balancing of the roll in the thrust disk 16 allows a constant air gap 27 to be maintained between the rotor surface 22 and the stator surface 23. In one embodiment, the radial reinforcing region 26 is disposed at the substantial axial midpoint between the thrust disk rotor surface 22 and a second surface 28 of the thrust disk 16. More particularly, it is preferred that the rotor disk 16 has an asymmetrical geometry about a radial axis Y (FIG. 4) which is located at the axial midpoint between surface 22 and 28. Further, the rotor disk 16 is symmetrical about the axial centerline X. The asymmetric geometry of the thrust disk 16 about the radial axis Y induces an additional counterclockwise roll to the thrust disk 16 to counteract the clockwise roll induced by the attractive force between the rotor 16 and the stator 17. It is understood herein that the roll induced by the asymmetric geometry and the roll induced by the radial reinforcing region 26 are balanced against the clockwise roll induced by the attractive forces between the stator 17 and the rotor 16 so as to position the rotor surface 22 and stator surface 23 substantially parallel and at a constant distance apart.

The radial reinforcing zone 26 is a substantially planar annular disk that is substantially parallel to the thrust disk rotor surface 22, and positioned normal to the axial centerline X. Further, the radial reinforcing zone 26 is spaced radially from the reinforced zone 25. In one embodiment the thrust disk 16 has a flux field portion 29 consisting solely of the iron-cobalt magnetic alloy so as to provide optimum electromagnetic properties within this portion.

With reference to FIGS. 6–10, there is illustrated schematic representations of a composite material structure 35 utilizing a soft magnetic alloy 31 and a plurality of high strength fibers 30 to increase the tensile strength of the structure 35 over the monolithic alloy defined by soft magnetic alloy 31. The composite structure may include the prior described magnetic thrust disks along with, but not limited to, other structures such as rotor laminates of an electric motor, or rotor laminates of a radial magnetic bearing. The composite structure has specific utilization in an electromagnetic application, and more particularly has use in a group consisting of motors, generators, relays and magnetic bearings. The present disclosure describes the composites in terms of a high strength fiber, however, it is contemplated herein that a tungsten wire is useable as a reinforcing member in the metallic matrix composites and structures defined herein. The composite structure with a tungsten wire would be fabricated using the methods described herein for the metallic matrix composites with fiber.

The soft magnetic alloy 31 preferably comprises a magnetically responsive metallic material and more preferably comprises an iron-based soft magnetic alloy, and most preferably comprises an iron-cobalt magnetic (Fe-Co) alloy. In one embodiment, cobalt is the primary alloying element and the amount of cobalt by weight is less than about 55%, and in a more preferred form, the amount of cobalt by weight is in the range from about 20% to about 55%. However, iron-cobalt magnetically responsive alloys having other amounts of cobalt are contemplated herein. These iron-cobalt alloys are high saturation, high Curie temperature, low core loss soft magnetic alloys. In one form of the present invention, the composite structure 35 is defined by a fabricated metal matrix composite comprising at least one high strength fiber 30 and the soft magnetic alloy material 31. In the preferred form of the fabricated composite structure 35, a plurality of high strength fibers 30 and an iron-cobalt alloy define the metal matrix composite structure. More preferably, the high strength fibers 30 are continuous and oriented in a circumferential direction for increased hoop strength. With reference to FIG. 4, there is illustrated an example of the use of the composite material structure within a thrust disk 16 which contains reinforced zones 25 and 26 that are formed of the composite structure 35. While the embodiment of thrust disk 16 illustrated herein does not include high strength fibers oriented in a radial direction it is contemplated herein that a composite structure can contain circumferential directed high strength fibers and/or radially directed high strength fibers. Further, chopped fibers can be utilized in an alternate embodiment along with or in the place of continuous fibers.

Figure 6:
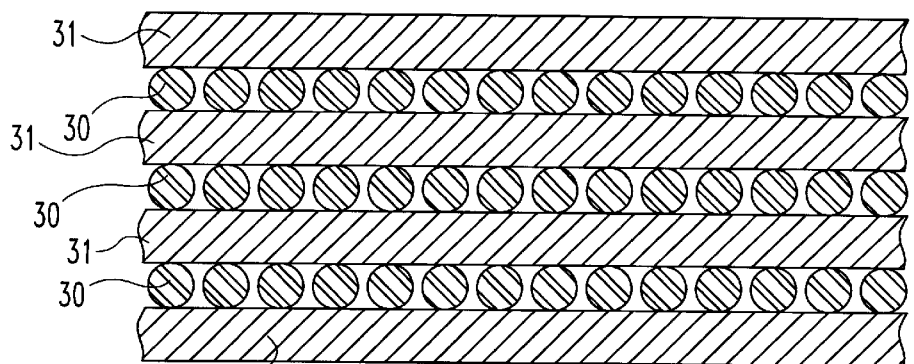
FIG. 6 is a schematic cross sectional view of one embodiment of a sandwich of magnetic alloy material and high strength reinforcing fibers prior to consolidation.

Referring to FIG. 6, there is illustrated a schematic representation of the plurality of high strength fibers 30 positioned between layers of the magnetic metal matrix alloy in an unconsolidated state. In one embodiment, the magnetic metal matrix alloy and the reinforcing material/high strength fibers 30 are stacked in alternating layers with the high strength fibers having a diameter of about 0.0056 inches, and the layers of metal matrix alloy having a thickness in the range of 0.003–0.015 inches. One preferred form utilizes metal matrix alloy sheets having a thickness of about 0.012 inches. However, other fiber diameters and metal matrix alloy thicknesses are contemplated herein. The unconsolidated assembly of magnetic alloy and the plurality of high strength fibers are then subjected to manufacturing techniques such as hot isostatic pressing (HIP) or vacuum hot pressing (VHP). The above manufacturing techniques include a combined pressure and thermal cycle that consolidate the magnetic metal matrix alloy 31 and the plurality of high strength fibers 30, provide good bonding and improved mechanical properties. The bonding between the magnetic metal matrix alloy portion defining a solid state joining. An illustration of the consolidated composite structure is set forth in FIG. 8.

Figure 7:
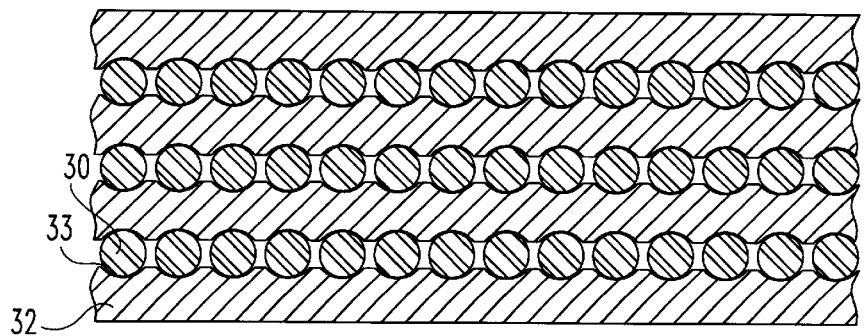
FIG. 7 is a schematic cross sectional view of an alternate embodiment of a sandwich of magnetic alloy material and high strength fibers prior to consolidation.
Figure 8:
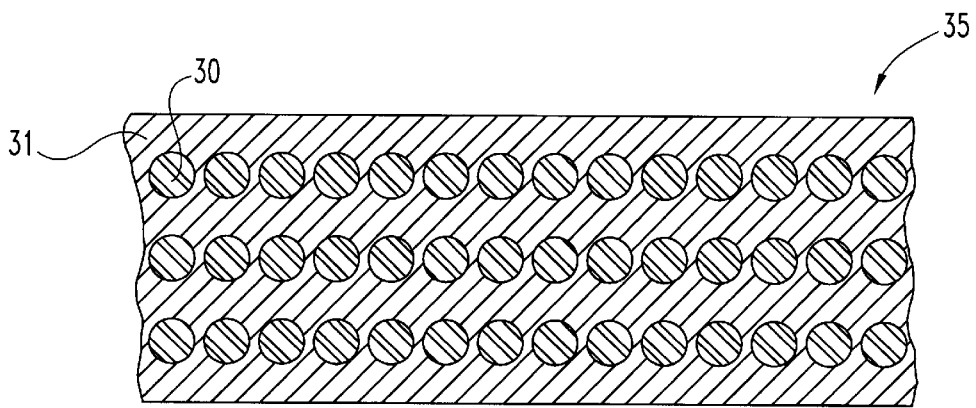
FIG. 8 is a schematic cross sectional view of one embodiment of a sandwich of magnetic alloy and high strength reinforcing fibers after consolidation.

With reference to FIG. 7, there is illustrated an alternate embodiment of the unconsolidated assembly of magnetic metal matrix alloy layers 32 and high strength fibers 30. The embodiment of FIG. 7 is substantially similar to the embodiment of FIG. 6 with a difference being that the layers of magnetic metal matrix alloy 32 have grooves 33 formed therein to receive the plurality of high strength fibers 30 therein. In one embodiment the grooves 33 are etched into the foil by conventional photolithographic techniques, however, other methods to form the grooves are contemplated herein. In one form of the present invention, the groove depth and width is controlled to maintain fiber spacing uniformity and adequate consolidation. Upon being subjected to the manufacturing techniques such as hot isostatic pressing (HIP) or vacuum hot pressing (VHP), the layers of magnetic metal matrix alloy 32 and high strength fiber 30 are substantially consolidated as set forth in FIG. 8.

Figure 9:
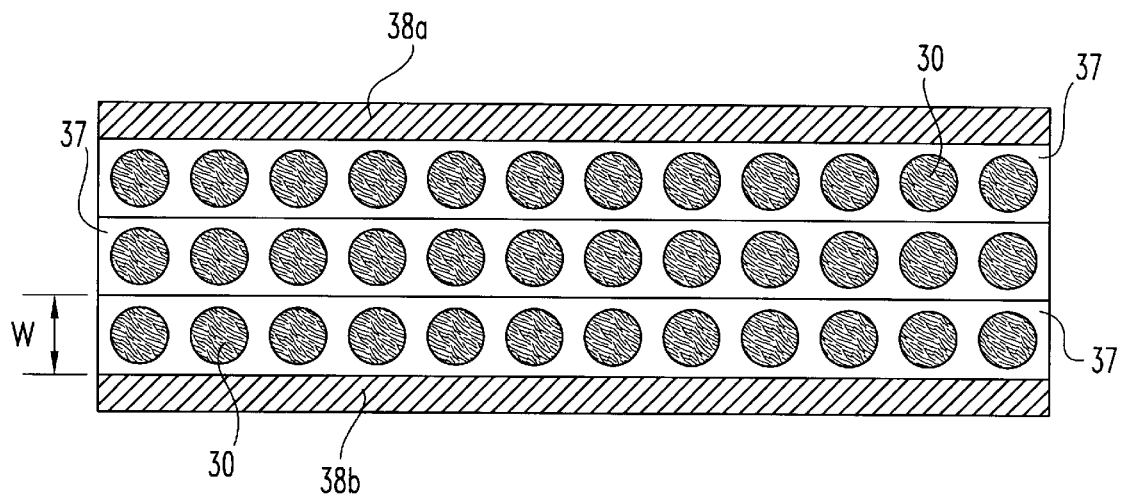
FIG. 9 is a schematic cross sectional view of one embodiment of an unconsolidated assembly comprising magnetic alloy material and high strength fibers.

With reference to FIG. 9, there is illustrated a schematic representation of an alternate embodiment of the unconsolidated assembly of magnetic metal matrix alloy and high strength fibers. A structure is formed from a plurality of monotapes 37, which are stacked between a monolithic top member 38a and a monolithic bottom member 38b formed of the magnetic metal matrix alloy. A monotape 37 is formed by depositing a magnetic alloy powder around the high strength fibers and subsequent drying. In one embodiment, the plurality of high strength fibers 30 have a diameter of about 0.0056 inches and the monotape has a thickness indicated by "W" of about 0.0075 inches. However, other fiber diameters and monotape thicknesses are contemplated herein. The unconsolidated assembly of monotapes 37 and members 38a and 38b are then subjected to manufacturing techniques such as hot isostatic pressing (HIP) or vacuum hot pressing (VHP), which results in monotapes 37 and the members 38a and 38b being substantially consolidated as set forth in FIG. 8.

Figure 10:
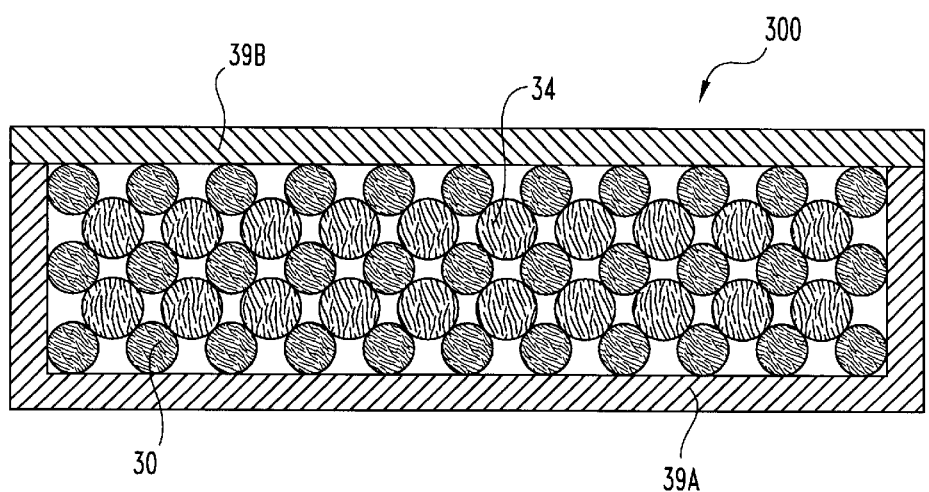
FIG. 10 is a schematic cross sectional view of another embodiment of an unconsolidated assembly comprising magnetic alloy material and high strength fibers.

With reference to FIG. 10, there is illustrated another embodiment of an unconsolidated assembly 300 of magnetic metal matrix alloy, and high strength fibers. A magnetic alloy wire 34 and the high strength fiber 30 are arranged in an ordered fashion within a monolithic receiver 39A. When the receiver 39A is full a monolithic sheet of magnetic alloy 39B is placed above the top of the receiver. In one embodiment the magnetic alloy wire has a diameter of about 0.007 inches and the high strength fiber has a diameter of about 0.0056 inches, however, other wire and fiber diameters are contemplated herein. The unconsolidated assembly 300 is subjected to manufacturing techniques such as hot isostatic pressing (HIP) or vacuum hot pressing (VHP). Thus, the high strength fiber, the magnetic alloy wire, and the magnetic alloy receiver 39A and top member 39B are substantially consolidated as set forth in FIG. 8. The assembly 300 can be applied to axisymetric structures where the magnetic alloy wire and the high strength fiber are co-wound on a mantrel and then subsequently consolidated by hot isostatic pressing (HIP) or vacuum hot pressing (VHP).

The fiber reinforced magnetic metal matrix composite exhibit strengths much higher than the monolithic magnetic alloy material. A person of ordinary skill in the art will appreciate that magnetic metal alloys are commercially available; examples of commercially available alloys include, but are not limited to HIPERCO®-27, HIPERCO®-27HS, HIPERCO®50, and HIPERCO® 50 HS. The prior alloys are not intended to be limiting and alloys generally comprising about 20% to about 55% by weight cobalt and about 45% to about 80% by weight iron with minor amounts of other materials such as Carbon, Manganese, Silicon, Nickel, Chromium, Vanadium, and/or Niobium are contemplated herein. Further, information related to the material composition by weight percent is provided in Table 1. The data presented in Table 1 is typical or average values and is not intended to represent maximum or minimum values for the materials.

In one embodiment, thin sheets of the magnetic metal matrix alloy are positioned so as to sandwich layers of high strength fibers and then processed under a combined high temperature and pressure cycle to obtain good consolidation. Thin sheets of material can be sized to the desired thickness by processes such as electro discharge machining (EDM) and etching. However, other techniques for sizing are believed within the contemplation of someone of ordinary skill in the art.

TABLE I

|  | C | Mn | Si | Ni | Co | Cr | Fe | V | Nb |
|---|---|---|---|---|---|---|---|---|---|
| HIPERCO ® 27 | 0.01% | 0.25% | 0.25% | 0.60% | 27.0% | 0.60% | *Bal | Na | Na |
| HIPERCO ® 27HS | 0.23% | 0.25% | 0.25% | 0.60% | 27.0% | 0.60% | *Bal | Na | Na |
| HIPERCO ® 50 | 0.01% | 0.05% | 0.05% | Na | 48.75% | Na | *Bal | 1.90% | 0.05% |
| HIPERCO ® HS | 0.01% | 0.05% | 0.05% | Na | 48.75% | Na | *Bal | 1.90% | 0.30% |

The high strength fibers are preferably inorganic fibers, and more preferably ceramic fibers. In one embodiment the fibers are desired as a monofilament fiber, and more preferably are formed of silicon carbide or alumina. However, multifilament fibers are also contemplated herein. Further, examples of some types of fibers that can be used, but are not intended to be limited herein, to enhance the tensile properties are available under the following tradenames: SCS-6™; Ultra SCS™; Sigma 1240™; Sigma 1140™; Amercom™; Trimarc™ 1 Trimarc™ 2, and, Saphikon™, which is a single crystal alumina fiber. The fibers are believed generally known to one of ordinary skill in the art. Further, the Sigma 1240™ and Sigma 1140™ fibers have a tungsten core (W) with a Titanium-Boron ($TiB_2$) coating. The SCS-6™ fiber is manufactured by Textron Specialty Materials and has a carbon core with a columnar layer of silicon carbide deposited in two passes. Ultra SCS™ fiber is manufactured by Textron Specialty Materials and has a carbon core with a single pass layer of equiaxed silicon carbide deposited by chemical vapor deposition techniques. The Trimarc™ I fiber has a tungsten core with a silicon carbide coating. Trimarc™ 2 fiber has a carbon core with a silicon carbide coating. Saphikon™ is a fiber defined by a single crystal AL203,EFG process. Further, the high strength fibers may be coated with the magnetic alloy or refractory elements prior to consolidation so as to minimize interfacial reactions during consolidation. A chemical vapor deposition (CVD) or a physical vapor deposition (PVD) process can be utilized to coat the high strength fibers. In one embodiment the Amercom™ fibers are coated with tungsten (W). This tungsten coating forms a good bond with the Amercom™ fibers and also serves as a reaction barrier between the fibers and the iron cobalt matrix alloy.

One preferred composite structure utilizes HIPERCO™-27 as the magnetic alloy material and a plurality of continuous high strength fibers sold under the trademark Ultra SCS. In one embodiment, the composite structure is fabricated by subjecting the unconsolidated assembly to a hot isostatic pressing operation (HIP), or vacuum hot pressing (VHP) operation at temperatures within the range of about 1350° Fahrenheit to about 1800° Fahrenheit and under pressures between about 10 Kpsi to about 30 Kpsi (Kpsi—one thousand pounds/square inch) and hold times at the maximum temperature between two and six hours. It is understood that hot isostatic pressing (HIP) and vacuum hot pressing (VHP) are well known to people of ordinary skill in the art.

The quantity, size and spacing of the fibers 30 as shown herein, is illustrative and is not intended to be read as a limitation. While the figures illustrate a plurality of high strength fibers, a composite structure having a single high strength fiber is contemplated herein. In the preferred embodiment, the plurality of circumferentially extending fibers 30 are spaced from one another in either an axial direction or in a radial direction. The present invention is applicable in both single-ply and multi-ply structures. In the preferred embodiment, the reinforced zones have a fiber cross-sectional area that is within the range of about 30–40% of the cross-section of the reinforced zones. After processing by hot isostatic pressing (HIP) or vacuum hot pressing (VHP), the plurality of high strength fibers 30 are bound together by the magnetic metal matrix alloy 31. Further, the magnetic metal matrix alloy 31 forms an exterior covering to protect the plurality of fibers 30 from damage due to handling or environmental effects. In one embodiment, the reinforced areas near the edges of the thrust disk maintain an exterior covering thickness within a range of about 0.030 inches to about 0.080 inches. However, other exterior covering thickness are within the scope of the present invention.

Figure 11:
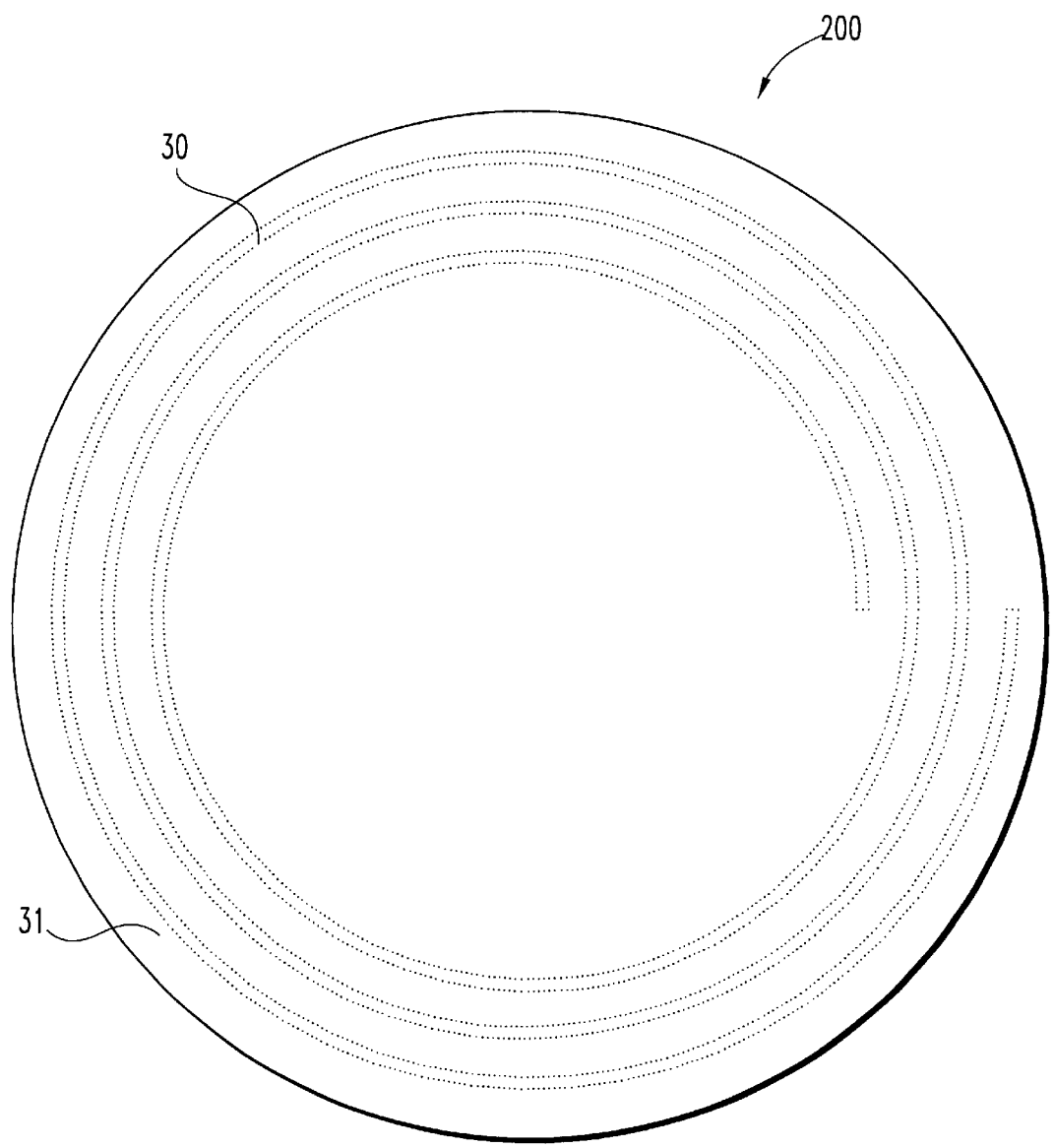
FIG. 11 is a plan view of a structure formed of the sandwich of the magnetic alloy and high strength reinforcing fibers of FIG. 8.

Referring to FIG. 11, there is illustrated a plan view of a circumstantial structure 200 formed of metal matrix alloy 31 and a continuous circumferential high strength fiber 30. In one form, the high strength fiber is a continuous circumferential winding extending from the ID to the OD of the reinforced zone. The structure 200 has been fully consolidated and the metal matrix alloy 31 encapsulates the fiber 30 and the fiber 30 increases the tensile capability of the structure.

Figure 12:
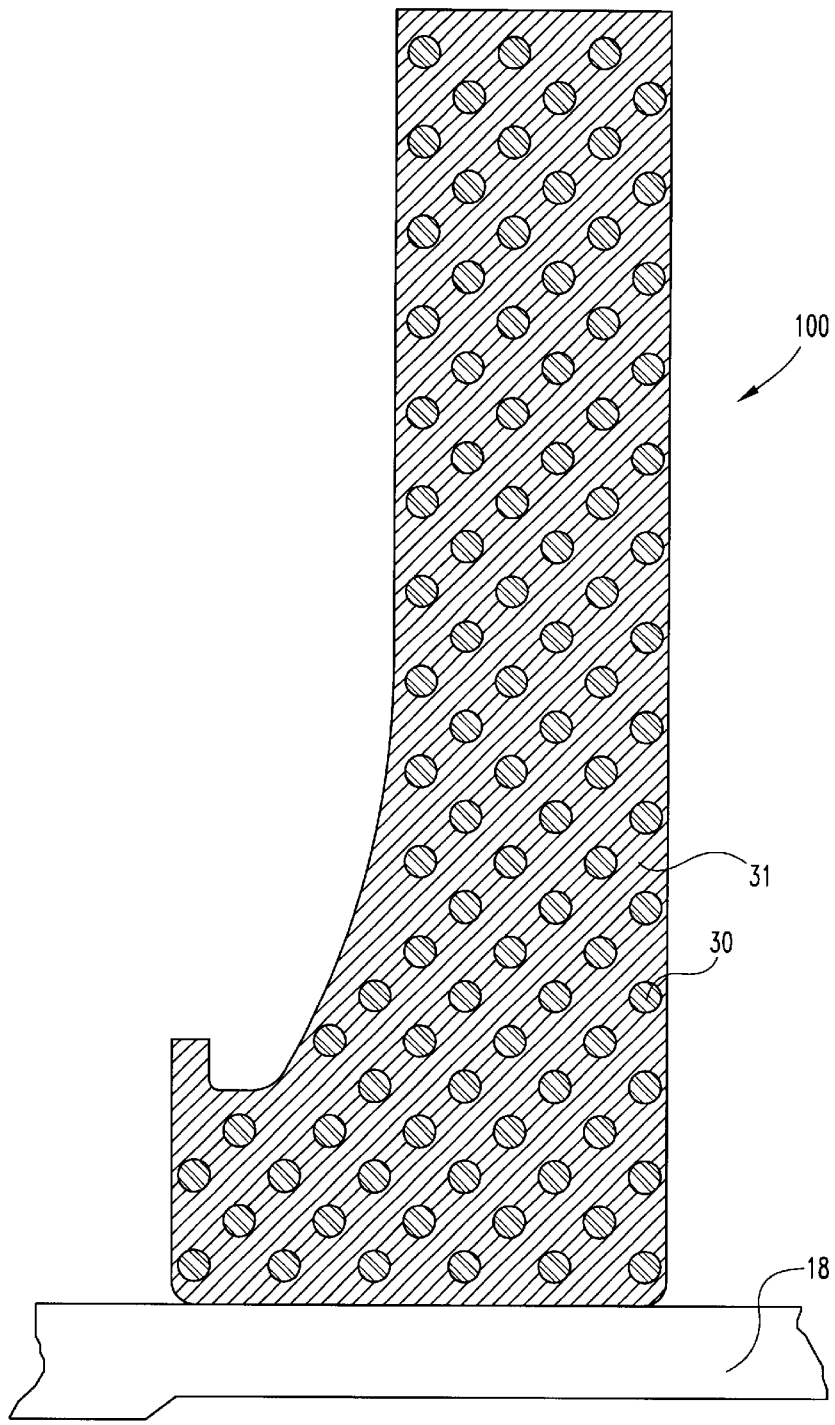
FIG. 12 is a cross-sectional view of an alternate embodiment of the reinforced magnetic thrust disk comprising a portion of the FIG. 3 magnetic thrust bearing.

With reference to FIG. 12, there is illustrated an alternative embodiment of a magnetic thrust disk 100 capable of operating at the high rotational speeds associated with a gas turbine engine. The magnetic thrust disk 100 defines a composite structure having a plurality of circumferential oriented high strength fibers 30 held together by the magnetic metal matrix 31 to form a composite reinforced disk. While the embodiment of thrust disk 100 has a substantially homogenous distribution of reinforcing fibers 30 in the cross-section, it is understood that in an alternate embodiment the distribution is not homogenous and there are regions without localized high strength fiber reinforcement.

Figure 13:
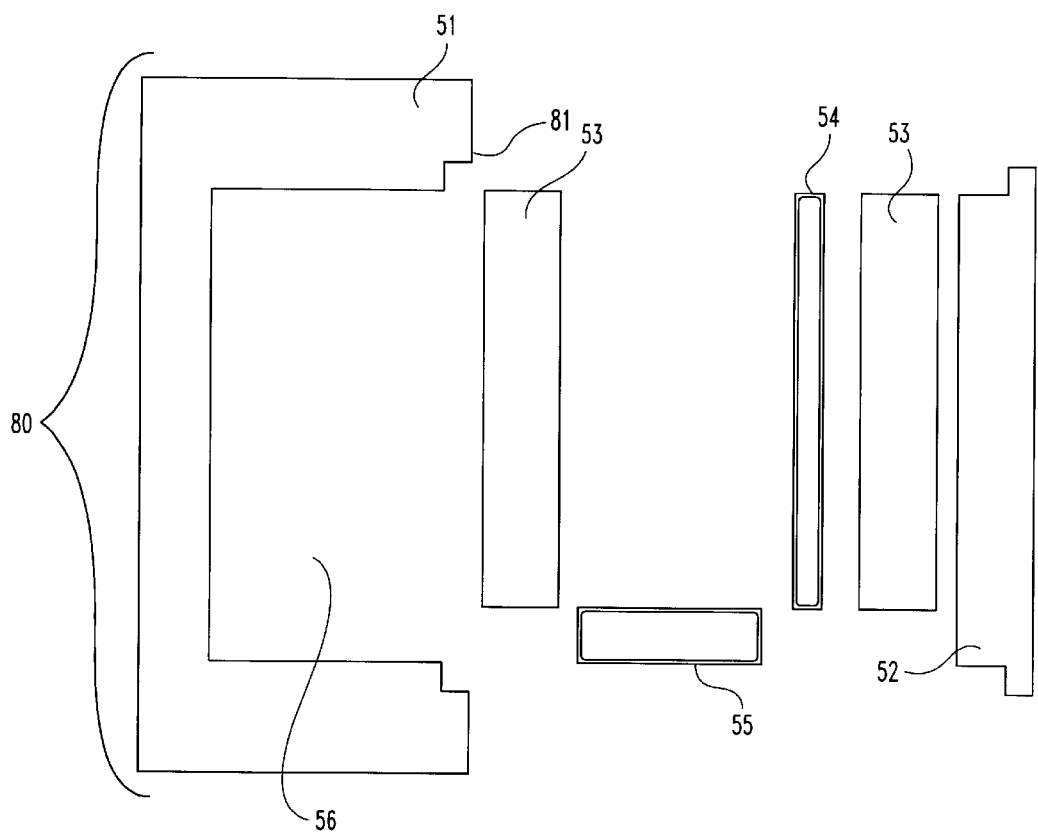
FIG. 13 is an exploded view of a portion of the reinforced thrust disk preform components prior to consolidation.
Figure 14:
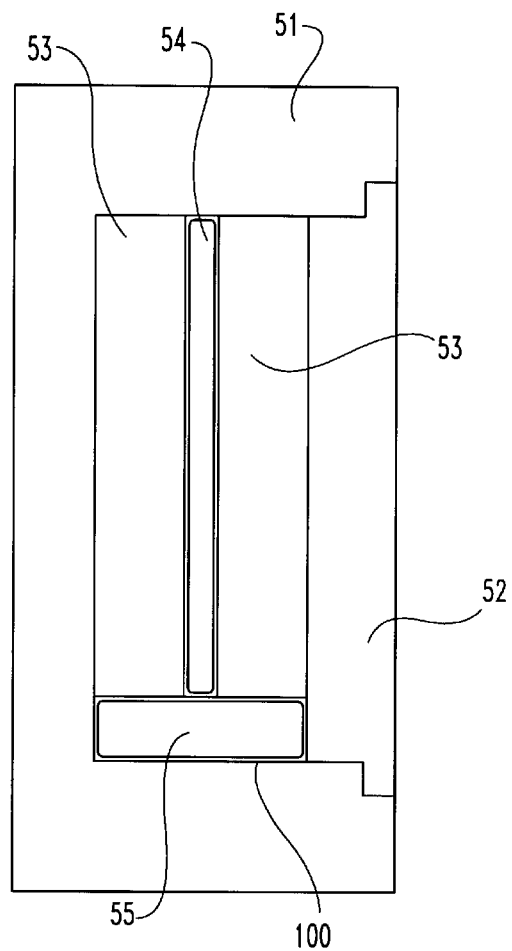
FIG. 14 is an illustrative representation of the reinforced disk preform components combined into a reinforced structure.
Figure 15:
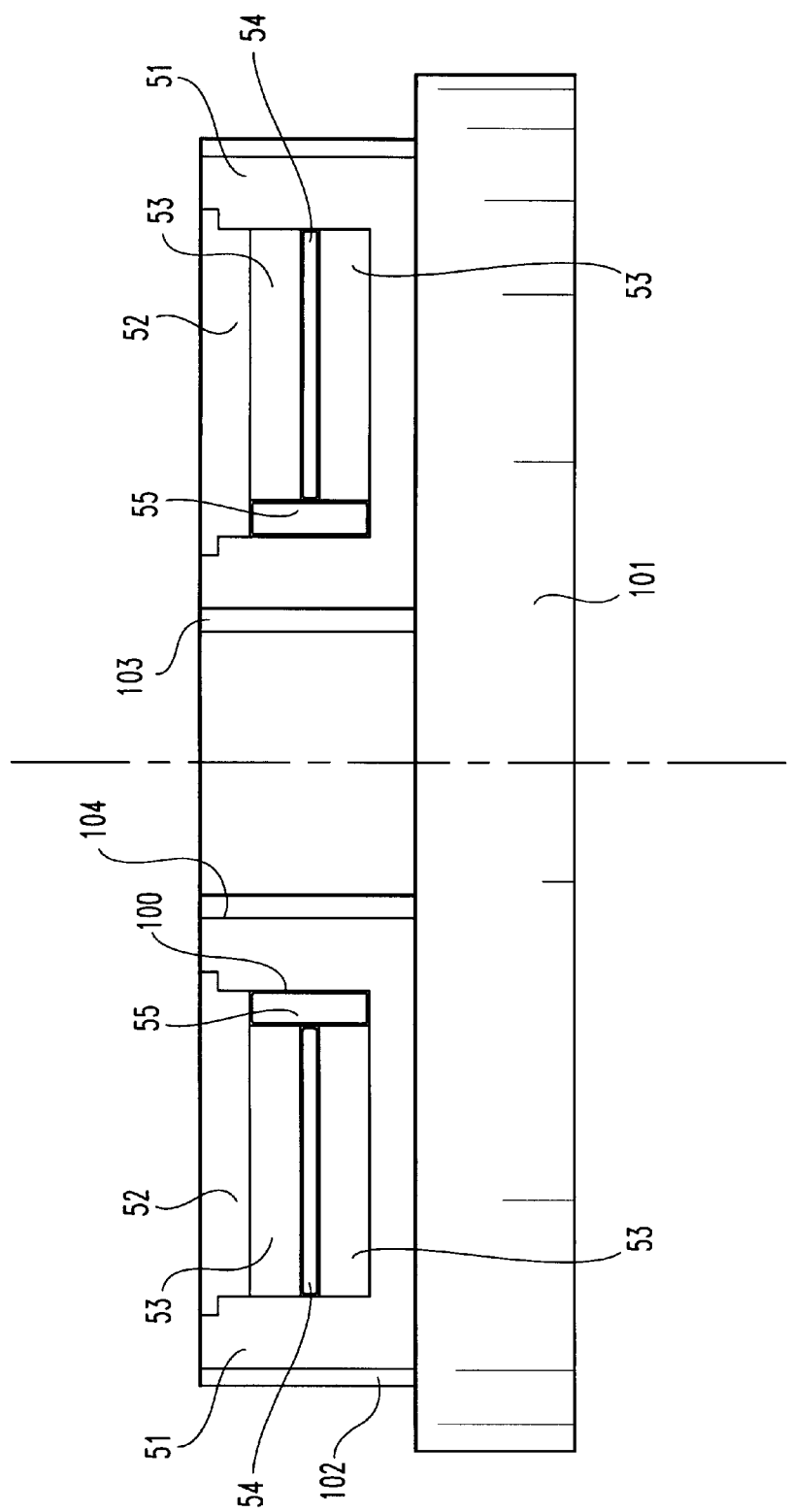
FIG. 15 is an illustrative view of one embodiment of the thrust disk having a pair of bonding rings engaging the disk during the bonding process.

With reference to FIGS. 13–15, there is illustrated a method for manufacturing a ring and/or disk containing select regions reinforced with a metallic matrix composite material. Metallic matrix composites are defined herein to include metal matrix composites and intermetallic matrix composites, and is not intended to be limited to use with metal matrix composites utilizing magnetic alloys. The method of manufacture will be described with reference to the production of a thrust disk, such as a disk 16. However, it is understood herein that other thrust disks having other geometries and regions of reinforcement are within the scope of present method of the manufacture. While an annular disk is illustrated, it is understood that a solid disk can be produced with the methods of the present invention. The method of manufacture is applicable to all forms of metallic matrix composites. While the method of manufacture will be described regarding introducing metallic matrix composite reinforcements of uniaxial hoop orienting fibers into select regions of a disk, it is understood that the method of manufacture would apply to other fiber orientations or combination of fiber orientations within a single zone or plurality of zones within the structure.

The selectively reinforced thrust disk is produced by combining a number of individual components. Referring to FIGS. 13–15, there is illustrated a preferred form of the present invention in which the components are symmetrical about the centerline X and define an annular disk. However, the present invention is applicable to other configurations, which are not symmetrical about the centerline. In one embodiment the individual components include a metallic c-section cup 51, a metallic cap 52, a pair of metallic rings 53, a radial reinforcing zone 54 and a bore reinforcing zone 55. In a more preferred embodiment the metallic components 51, 52 and 53 are monolithic, however, the disclosure is not intended to be limited herein to monolithic components. Further, the geometry is not limited to an annular c-section cup, and other geometric configurations for members having a space herein is contemplated by the present invention. As disclosed above, the reinforcing zones comprise metallic matrix composite material formed from any one of the common fiber matrix lay up procedures, including, but not limited to; foil-fiber-foil, coated fiber, tape casting or wire-fiber. It is preferred that the reinforcing zones comprise magnetic metal matrix components; however, the present method is not limited to use with magnetic metal matrix components.

In a preferred form of the present invention, the metallic matrix composite reinforcing zones 54 and 55 are in an unconsolidated form when made a portion of a perform assembly 80. The entire preform assembly 80 is then subjected to a pressure and thermal cycle associated with hot isostatic pressing (HIP) or vacuum hot pressing (VHP). Subjecting the preform assembly 80 with unconsolidated reinforcing zones to a single consolidation process maximizes the composite materials strength by only subjecting the plurality of high strength fibers within the reinforcing zones to a single temperature cycle. In an alternate embodiment, the metallic matrix composite reinforcing zones are formed of pre-consolidated components, which have undergone a first thermal and pressure cycle. In the alternate embodiment the preform assembly 80 includes the pre-consolidated composite zones and the entire preform assembly is then subjected to a temperature and pressure cycle in order to bond the components together. The pressure and thermal cycle causes the metallic matrix to be metallurgically bonded to the metallic members forming a portion of the preform assembly 80.

The composite bore-reinforcing zone 55 is placed within the c-section shaped space 56 of the monolithic c-section cup 51. The composite bore reinforcing zone 55 is of an annular section and has an inner surface 100 disposed adjacent the c-section cup 51. Thereafter, one of the rings 53 is placed within the space 56 adjacent the bore reinforcing zone 55 in the c-section cup 51. The radial reinforcing zone 54 is positioned adjacent and abutting the first ring 53 and the second ring 53 is disposed adjacent and abutting the radial reinforcing zone 54 within the space 56. The cap 52 is positioned adjacent the open end 81 of the c-section cup 51.

In one embodiment, the environment within the space 56 is evacuated and the c-section cup 51 and the cap 52 are welded together in order to provide a sealed environment. The welding operation is preferably done by electron beam welding. In an alternate embodiment, which is often utilized for materials that cannot be easily welded together, the preform assembly is evacuated and encased in a steel bag, which is then sealed by welding. After the preform assembly 80 has been properly evacuated and placed in a sealed state, the assembly 80 is subjected to a hot isostatic pressing (HIP) operation to consolidate the metallic matrix reinforcing zones and join the plurality of monolithic components together and join a portion of the metallic matrix to the components. In the case where the reinforcing zones were pre-consolidated the second thermal and pressure cycle results in the bonding of the individual components together. In one embodiment, the assembly 80 is consolidated at temperatures within a range of about 1350° Fahrenheit to about 1800° Fahrenheit and under pressures between about 10 kpsi to about 30 kpsi and hold times at the maximum temperature between about two and about six hours.

The preferred form of the method of manufacturing includes placing the preform assembly 80 on a thick member 101 to back up the assembly and minimize distortion during the high temperature and pressure cycle. In the preferred form of the present invention the thick member 101 defines a molybdenum plate, and more preferably is a molybdenum plate having a thickness of about 0.5 inches. Further, a restraining ring 102 may be positioned around the outer periphery of the outer wall member of the preform assembly to aid in the generation of pressure at the bonding interfaces during the joining process. Preferably, the restraining ring 102 is formed of a molybdenum material. An inner member 103 can be placed within the bore of the preassembly 80 to abut an outer surface 104 of the metallic member 51 to generate bond interface pressure during the joining process. In a preferred form of the present invention the inner member 103 defines a molybdenum ring. The preform assembly 80 after being subjected to the bonding cycle is machined as needed to the desired geometry by known manufacturing techniques.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An electromagnetic thrust bearing, comprising:
    a stator having a stator surface;
    a rotor having a rotor surface spaced from said stator surface, said rotor having a first internally reinforced portion for inducing a first roll to said rotor to cancel at least a portion of an opposite second roll induced in said rotor by an attractive force between said rotor and said stator.

2. The thrust bearing of claim 1, which further includes an axial centerline, and wherein said first internally reinforced portion extending radially relative to said axial centerline.

3. The thrust bearing of claim 2, wherein said first internally reinforced portion is proportioned such that it is radially long and axially short.

4. The thrust bearing of claim 3, wherein said rotor has a rotor portion formed of a soft magnetic alloy and wherein said first internally reinforced portion is formed of at least one elongated high strength member bonded with a quantity of a soft magnetic alloy.

5. The thrust bearing of claim 4, wherein said at least one high strength member defines a plurality of elongated high strength members which are continuous and extend circumferentially within said rotor, and wherein an exterior skin formed of said magnetic alloy covers said rotor.

6. The thrust bearing of claim 5, wherein said soft magnetic alloy comprises an iron-cobalt material, and wherein said plurality of high strength elongated members are formed of an inorganic material.

7. The thrust bearing of claim 6, wherein each of said high strength members define a high strength fiber formed of a material selected from the group consisting of SCS-6™, Ultra SCS™, Sigma 1240™, Amercom™, Saphikon™, Sigma 1140™, Trimarc 1™, and Trimarc 2™, and wherein said magnetic alloy has from about twenty percent to about fifty-five percent by weight cobalt.

8. The thrust bearing of claim 5, wherein at least one of said high strength members is formed of a tungsten wire.

9. The thrust bearing of claim 1, wherein said first roll is a counterclockwise directed roll for counteracting said second clockwise roll associated with the attractive forces between said rotor and said stator, and wherein said rotor has a radial axis that extends radially from an axial midpoint of said rotor, and wherein said rotor is asymmetric about said radial axis and said rotor asymmetry induces a third roll in a counterclockwise direction for counteracting the attractive forces between said rotor and said stator.

10. The thrust bearing of claim 1, wherein said rotor has a bore, and which further includes a second internally reinforced portion adjacent said bore to control bore growth.

11. The thrust bearing of claim 1, which:
    further includes a shaft rotatable within a gas turbine engine;
    said rotor is fixedly coupled to said shaft and spaced from said stator so that the attractive forces between said rotor and said stator counteract axial thrust loading, and wherein said rotor defines a magnetic thrust disk having a substantially annular configuration with a bore disposed in an interference fit with said shaft;
    a second internally reinforced portion formed of a plurality of high strength elongated members that are continuous and extend circumferentially and a soft magnetic alloy to define a consolidated metal matrix composite, and wherein said second internally reinforced portion minimizing the growth of said bore; and
    said first internally reinforced portion is formed of a plurality of high strength elongated members that are continuous and extend circumferentially and a soft magnetic alloy to define a consolidated metal matrix composite, and wherein a remainder portion of said rotor disk is formed of said soft magnetic alloy.

12. The thrust bearing of claim 11, wherein said reinforced portions are substantially encapsulated by said soft magnetic alloy, and wherein said soft magnetic alloy is defined by an iron-cobalt type material comprising from about twenty percent to about fifty-five percent by weight cobalt and from about forty-five percent to about eighty percent by weight iron, and wherein said plurality of high strength elongated members are selected from one of a high strength fiber and a high strength wire.

13. The thrust bearing of claim 12, wherein said plurality of high strength elongated member include a tungsten wire.

14. An apparatus, comprising:
    a magnetically responsive member having an iron based soft magnetic alloy portion, said member having a bore formed therein that is internally reinforced with a first high strength magnetic matrix composite zone for controlling bore growth, and wherein said member is internally reinforced with a second high strength magnetic matrix composite zone substantially normal to said first high strength magnetic matrix composite zone, and further wherein said high strength magnetic matrix composite zones include said magnetic alloy and at least one high strength fiber.

15. The apparatus of claim 14, wherein said member has a tensile strength greater than the tensile strength of said iron based soft magnetic alloy portion, and wherein said at least one high strength fiber is joined with said magnetic alloy.

16. The apparatus of claim 14, wherein said at least one high strength fiber defines a plurality of high strength fibers, and wherein each of said plurality of high strength fibers are bound together by said magnetic alloy.

17. The apparatus of claim 14:
which further includes an active electromagnetic stator for emitting a magnetic flux field that interacts with said member;
said member has a circular shape and a tensile capacity greater than the tensile capacity of said soft magnetic alloy portion;
said at least one high strength fiber defines a plurality of high strength fibers oriented in a substantially circumferential direction; and
wherein each of said magnetic matrix composite zones are consolidated and said plurality of high strength fibers are bound together by said magnetic alloy.

18. The apparatus of claim 17, wherein said magnetic alloy material defines an iron-cobalt type material having less than about fifty-five percent by weight cobalt and about forty-five percent to about eighty percent by weight iron, and wherein said plurality of fibers are inorganic monofilaments.

19. The apparatus of claim 14:
which further includes a gas turbine engine having a shaft; and
said bore and said shaft are maintained in interference fit during normal operation of said engine.

20. The apparatus of claim 14, wherein said member has a tensile strength greater than the tensile strength of said iron based soft magnetic alloy portion, and wherein at least one of said high strength magnetic matrix composite zones has a high strength wire therein.

21. The apparatus of claim 20, which further includes at least one high strength fiber within said at least one of said high strength magnetic matrix composite zones.

22. The apparatus of claim 21, wherein said high strength wire is defined by a tungsten wire.

* * * * *